United States Patent [19]
Lim et al.

[11] Patent Number: 5,854,691
[45] Date of Patent: Dec. 29, 1998

[54] FACSIMILE INFORMATION PROCESSING APPARATUS FOR VIDEO CASSETTE TAPE RECORDER AND METHOD OF THE SAME

[75] Inventors: Yongtaik Lim, Seoul; Seyong Ro, Kyungki-Do; Insung Hwang, Kyungki-Do, all of Rep. of Korea

[73] Assignee: LC Electronics Inc., Seoul, Rep. of Korea

[21] Appl. No.: 690,562

[22] Filed: Jul. 31, 1996

[30] Foreign Application Priority Data

| Jul. 31, 1995 | [KR] | Rep. of Korea | 1995 23485 |
| Oct. 24, 1995 | [KR] | Rep. of Korea | 1995 36767 |
| Oct. 24, 1995 | [KR] | Rep. of Korea | 1995 36768 |
| Dec. 18, 1995 | [KR] | Rep. of Korea | 1995 51438 |

[51] Int. Cl.$^6$ .................................................... H04N 5/782
[52] U.S. Cl. ............................ 358/403; 358/442; 386/81
[58] Field of Search ........................... 358/403, 434–436, 358/438–440, 442, 468, 426; 386/68, 81, 125–126; 360/72.1, 72.3; H04N 1/32, 51/76, 5/782, 5/783

[56] References Cited

U.S. PATENT DOCUMENTS

| 5,619,338 | 4/1997 | Nakai et al. | 386/126 |
| 5,644,404 | 7/1997 | Hashimoto et al. | 358/434 |
| 5,666,210 | 9/1997 | Yanai et al. | 358/434 |

*Primary Examiner*—Kim Yen Vu
*Attorney, Agent, or Firm*—Birch, Stewart, Kolasch & Birch, LLP

[57] ABSTRACT

An improved facsimile information processing apparatus and a method of the same which are capable of overcoming the resolution difference problem between a facsimile machine, a television, and a VCR, more easily searching a desired information, and selectively printing the facsimile information displayed on the screen as a result of the search, which includes a decoder for converting a facsimile information transmitted thereto into a binary data; a frame memory for dividing the facsimile information as much as one sheet into a plurality of frames and for storing it; a converter for converting the binary data of the decoder into a parallel data of a byte unit, storing it in the frame memory, and converting the frame data read from the memory into a serial data; a switch for selectively outputting between the serial data of the converter and a luminance signal divided from a broadcast signal; a signal modulator for modulating the output of the switch to have a predetermined recording characteristic; a record/reproduce unit for receiving the output of the signal modulator and for performing the record/reproduce operation; and an image encoder for converting the signal inputted thereto through the switch into a combined image signal and for outputting it to a television monitor.

13 Claims, 9 Drawing Sheets

FACSIMILE INFORMATION PROCESSING APPARATUS FOR VIDEO CASSETTE TAPE RECORDER AND METHOD OF THE SAME

BACKGROUND OF THE INVENTION

1. Field of the Invention

The present invention relates to a facsimile information processing apparatus for a video cassette tape recorder (VCR) and a method of the same, which are capable of comprehensibly performing screen display, recording, search, printing, and the like of a facsimile information transmitted thereto by incorporating a facsimile function into a VCR.

2. Description of the Conventional Art

Generally, a facsimile machine is directed to compressing a text image to have a binary image signal format and then transmitting it, or printing it on a predetermined paper by receiving the compressed image signal, and modulating and coding it, with the facsimile machine being capable of printing a text paper having 1728 dots/mm in its horizontal direction.

However, the facsimile machine has limited functions in accordance with its features. In addition, since it is designed to have a thermal printing feature, the electric consumption is high, and the fabrication cost is expensive.

However, as the technique related thereto is advanced, the facsimile machine is increasingly necessary in the industry and even at home.

Therefore, in the industry, the facsimile machine, having a feature of displaying a facsimile information on a screen, storing the information, searching and printing the same by incorporating the above-mentioned features into the facsimile machine, is needed.

Figure 1:
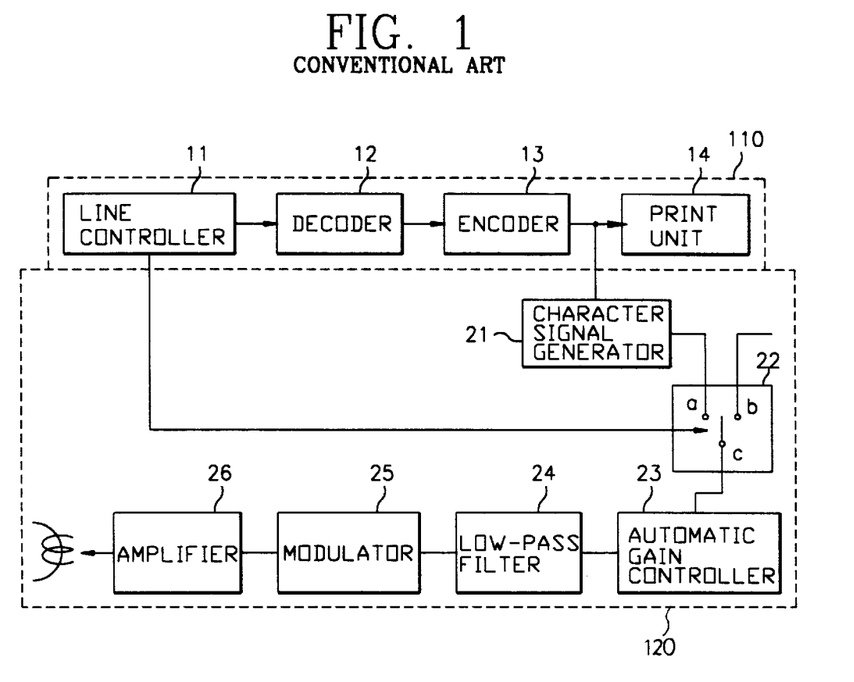
FIG. 1 is a block diagram of a conventional facsimile information processing apparatus for a VCR.

The conventional facsimile information processing apparatus for a VCR includes a print section 110 for modulating a facsimile information transmitted thereto and for printing the information on a predetermined paper, and a recording section 120 for generating a character data from the coded facsimile information and for recording it on a video tape.

The print section 110 includes a line controller 11 for controlling connections between corresponding elements, a decoder 12 for modulating and coding the facsimile information inputted thereto through the line controller 11, an encoder 13, and a print unit 14 for receiving an output of the encoder 13 and printing the output on a predetermined paper.

The recording section 120 includes a character signal generator 21 for generating a character signal from the output of the encoder 13, a switch 22 for outputting the character signal and a video signal VS generated by the character signal generator 21 in accordance with the control of the line controller 11, an automatic gain controller 23 for maintaining a constant output level by amplifying the output of the switch 22, a low-pass filter 24 for receiving and filtering the output of the automatic gain controller 23, a modulator 25 for modulating the output of the low-pass filter 24, and an amplifier 26 for amplifying the output of the modulator 25 and for outputting it to a video head 27.

The operation of the conventional facsimile information processing apparatus for a VCR will now be explained with reference to the accompanying drawings.

First, when the facsimile information transmitted from one facsimile machine is inputted to another facsimile machine through the line controller 11, the thusly received facsimile information is converted into its original signal through the decoder 12 and the encoder 13, and is printed on a predetermined paper by the print unit 14.

In addition, the character signal generator 21 generates a character signal from the character of the encoder 13 and outputs it to the switch 22.

Here, the switch 22 outputs a video signal at usual time, and when a certain signal of the facsimile information is inputted thereto from the line controller 11, and a driving terminal "c" is connected to a fixed terminal "a", and the character signal generated by the character signal generator 21 is outputted to the automatic gain controller 23.

Therefore, the character signal which is gain-adjusted by the automatic gain controller 403 is filtered by the low-pass filter 404 and is inputted to the modulator 405, and the modulator 405 modulates the output signal of the low-pass filter 404 in accordance with a recording format and outputs it to the amplifier 406, and thus the character signal is recorded on the video tape in cooperation with the video head 407.

Thereafter, a user selects the reproducing mode, searches the character image information recorded on the video tape, and selectively prints it on a predetermined paper.

However, the resolution of a television is generally ranged from about 300 through 800, however, the resolution of the VCR is 220. In addition, the facsimile machine has a resolution of 1728 dots/mm in its horizontal direction.

Therefore, the conventional facsimile information process apparatus for a VCR has a disadvantage in that it is impossible to record the facsimile information on the video tape of the VCR and to display the same on the screen due to their respective resolution differences, and in order to resolve the above-mentioned problem, the resolution of the television should be improved.

In addition, though the facsimile information is recorded on the video tape, the recorded facsimile information should be individually searched step-by-step so as to search a desired information when reproducing the information.

SUMMARY OF THE INVENTION

Accordingly, it is an object of the present invention to provide a facsimile information processing apparatus for a VCR and a method of the same, which overcome the problems encountered in a conventional facsimile information processing apparatus.

It is another object of the present invention to provide an improved facsimile information processing apparatus and a method of the same which are capable of overcoming the resolution difference problem between a facsimile machine, a television, and a VCR, more easily searching a desired information, and selectively printing the facsimile information displayed on the screen as a result of the search.

To achieve the above objects, there is provided a facsimile information processing apparatus which includes a decoder for converting a facsimile information transmitted thereto into a binary data; a frame memory for dividing the facsimile information as much as one sheet into a plurality of frames and for storing it; a converter for converting the binary data of the decoder into a parallel data of a byte unit, storing it in the frame memory, and converting the frame data read from the memory into a serial data; a switch for selectively outputting between the serial data of the converter and a luminance signal divided from a broadcast signal; a signal modulator for modulating the output of the switch to have a predetermined recording characteristic; a record/reproduce unit for receiving the output of the signal modulator and for performing the record/reproduce operation; and an image encoder for converting the signal inputted thereto through the switch into a combined image signal and for outputting it to a television monitor.

To achieve the above objects, there is provided a facsimile information processing method which includes the steps of recording the received facsimile information in the frame memory which is divided into a plurality of frames and the facsimile information arranged in a form of the frame unit and outputted from the frame memory on a video tape; searching the facsimile information of a selection menu by detecting the frame code from the video tape when the search mode is set; and scrolling a predetermined information by moving the facsimile information searched and displayed on the screen in the rightward and leftward direction.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 2:
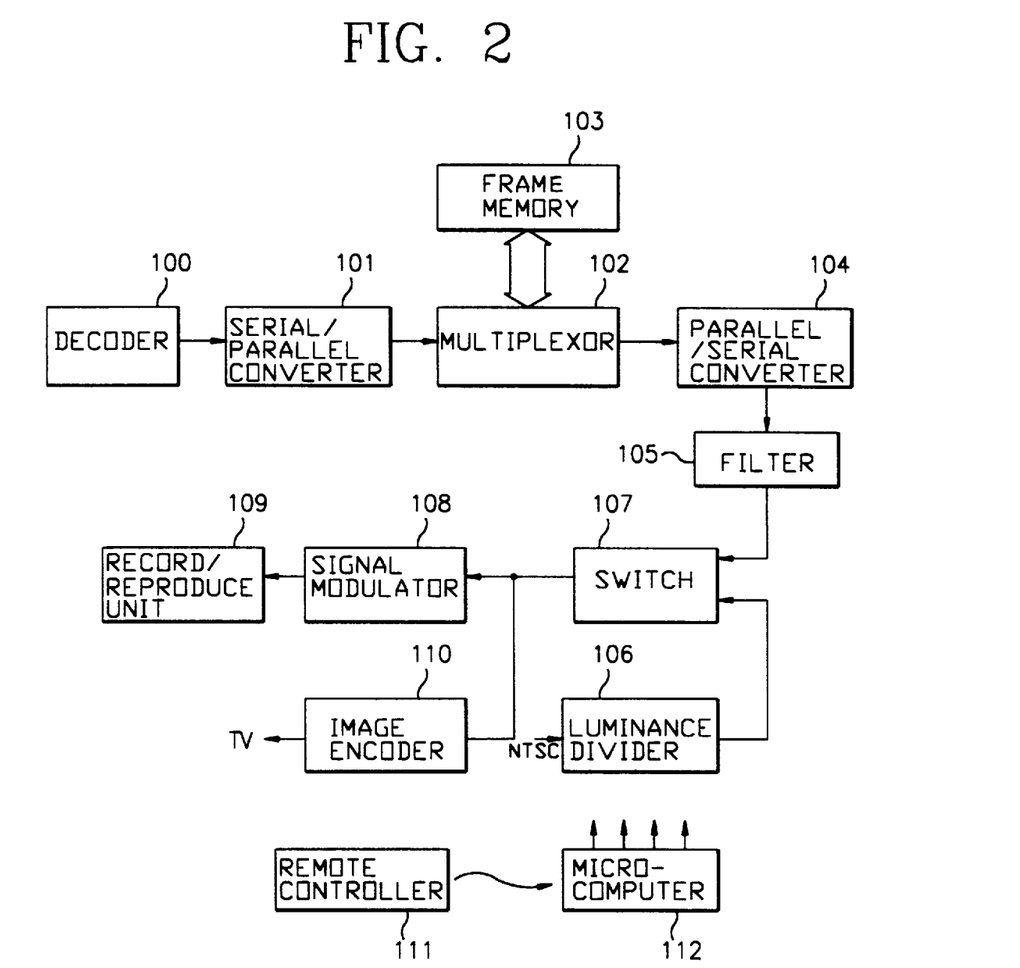
FIG. 2 is a block diagram of a facsimile information processing apparatus for a VCR according to the present invention.

FIG. 2 is a block diagram of a facsimile information processing apparatus for a VCR according to the present invention, which includes a decoder 100 for recovering the facsimile information transmitted thereto into a binary data, a serial/parallel converter 101 for converting a binary data of the decoder 100 into a parallel data of byte unit, a multiplexor 102 for selectively outputting the parallel data of the serial/parallel converter 101, a frame memory 103 for storing the parallel data outputted from the multiplexor 102 in a form of the frame unit, a parallel/serial converter 104 for converting the storing data of the frame memory 103 into a serial data, a filter 105 for removing a noise from the serial data of the parallel/serial converter 104, a luminance divider 106 for dividing the luminance signal from the broadcast signal transmitted from an antenna, a switch 107 for selectively outputting between the output of the luminance divider 106 and the output of the filter 105, a signal modulator 108 for modulating the signal inputted thereto through the switch 107 to have a proper recording characteristic and for outputting it to a record/reproduce unit 109, an image encoder 110 for converting the signal inputted through the switch 107 into a combined image signal and for outputting it to the television monitor, and a microcomputer 112 for performing the entire control operation of the system in accordance with the key input of a remote controller 111.

The frame memory 103 is composed of two frame pools 103*a* and 103*b* each having a memory space which is one-third the space in which the facsimile information as much as one sheet can be stored, and these two frame pools 103*a* and 103*b* alternately perform write and read operations.

The operation of the present invention will now be explained with reference to the accompanying drawings.

Figure 4:
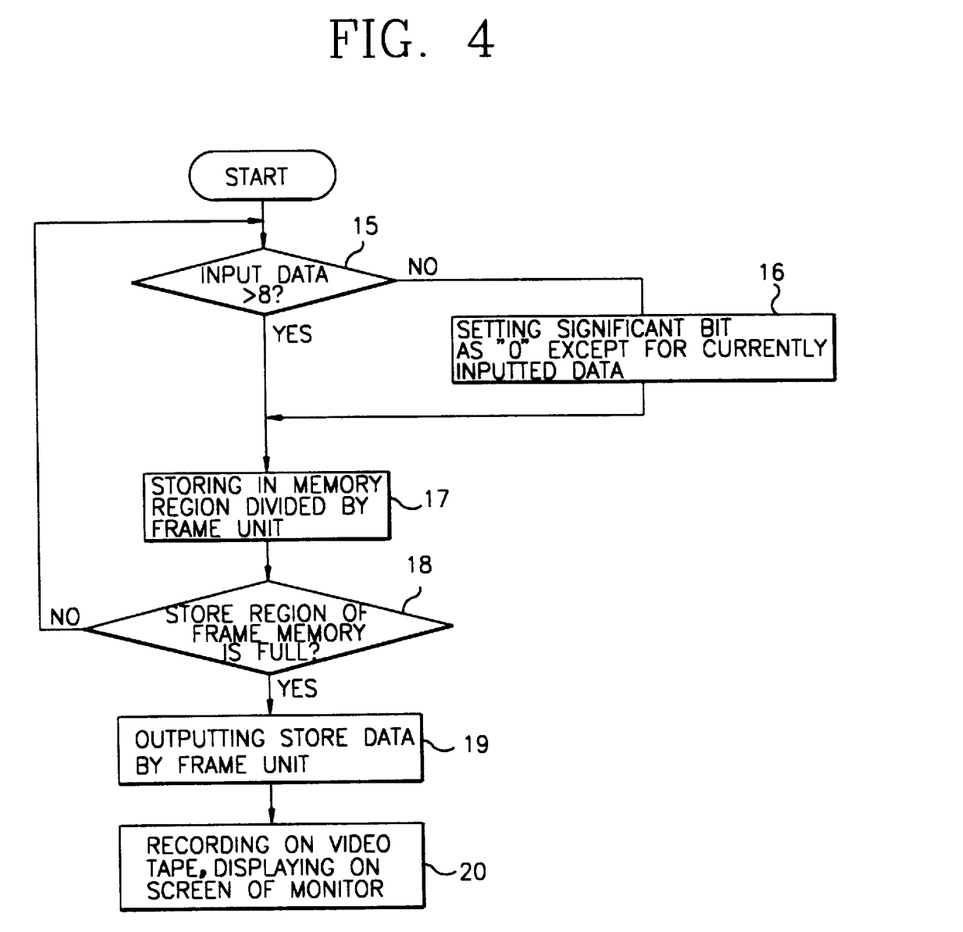
FIG. 4 is a flow chart of the flow of the facsimile information stored in a frame memory according to the present invention.

First, the processes for storing the received facsimile information on the video tape will be explained with reference to FIGS. 2 and 4.

When a facsimile information is received, the decoder 100 converts the white and black components of the facsimile information into a binary data such as "0" and "1" and outputs it to the serial/parallel converter 101, and the serial/parallel converter 101 counts the binary data outputted from the decoder 100. Here, when eight binary data (the white or black data) is filled in one byte (step 15), the count value is cleared, and one byte data is outputted, and the flag is set as "1".

Meanwhile, when the counted number of the binary data is not 8, the binary data which are inputted until the current time are filled from the lower bit, and the empty upper bit is filled by "0", and the flag is set as "0", and the coefficient operation is repeated (step 16).

The binary data of one byte counted by the serial/parallel converter 101 is alternately stored in the frame pools 103*a* and 103*b* of the frame memory 103 through the multiplexor 102 (step 17), and when the frame memory 103 is filled (step 18), the data stored in the frame memory 103 is outputted in a form of the frame unit and is recorded on each video tape, and then the data is displayed on the television monitor (steps 18, 19, and 20).

Here, the microcomputer 112 detects the flag of "1" outputted from the serial/parallel converter 101 and controls the switching operation of the multiplexor 102.

Figure 3:
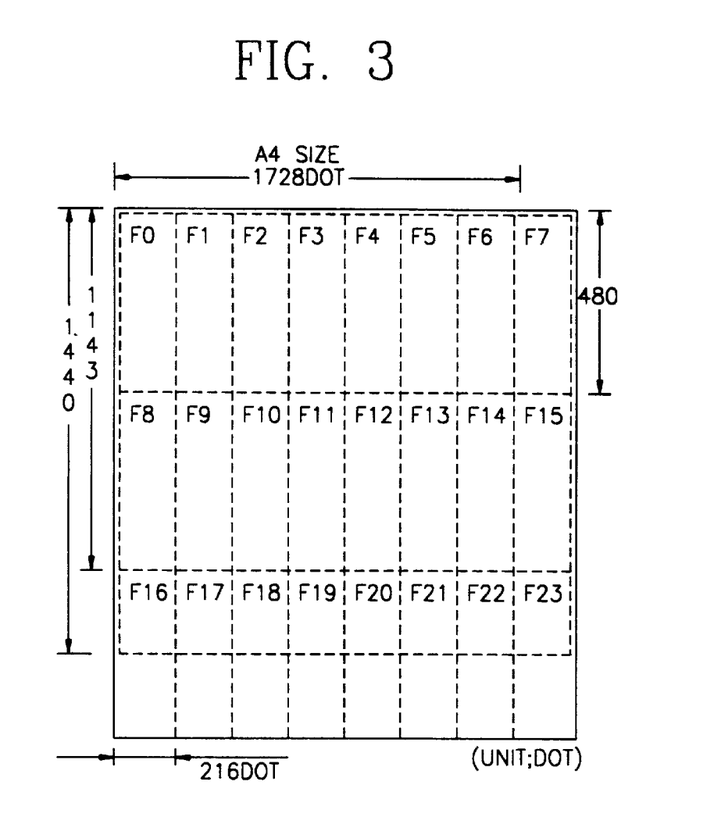
FIG. 3 is a view showing an example that a facsimile information as much as one sheet is divided into a plurality of frames according to the present invention.

Meanwhile, the facsimile information as much as one sheet is divided into 24 frames as shown in FIG. 3 due to the resolution difference between the facsimile machine and the VCR, with one frame having 216 dots/mm(27 bytes) in the horizontal direction, and 480 lines in the vertical direction.

Therefore, since two frame pools 103*a* and 103*b* of the frame memory 103 are composed of a memory space which is capable of storing information one-third one sheet with respect to the facsimile information as much as one sheet, each of the two frame pools 103*a* and 103*b* is capable of storing data as much as eight frames.

In addition, the operation for storing the binary data of byte unit into the two frame pools 103*a* and 103*b* of the frame memory 103 is as follows.

First, each of the frame pools 103*a* and 103*b* is divided into eight frames so as to store the binary data of the byte unit outputted from the serial/parallel converter 101 into the two frame pools 103*a* and 103*b*.

Here, on the assumption that the binary data of the byte unit is firstly stored in the frame pool 103*a*, the binary data is stored as pixels within a region defined from the start pixel of the first frame (F0) to 216 dots/mm (27 bytes) in the rightward direction and to 480 lines in the vertical direction. When the storing process of the first frame (F0) is finished, the binary data are stored as pixels within a region defined from the start pixel of the second frame (F1) to 216 dots/mm (27 bytes) in the rightward direction and to 480 lines in the vertical direction.

Thereafter, the above-mentioned processes are repeatedly performed until the eighth frame (F7), and the data amounting to eight frames is stored. The stored data is outputted to the parallel/serial converter 104 through the multiplexor 102 one-by-one, and the microcomputer 112 sequentially stores the binary data of byte unit outputted from the serial/parallel converter 101 by controlling the multiplexor 102 in the above-mentioned manner with respect to the frames (F8–F15) of the frame pool 103b.

In addition, when storing of the data as much as eight frames into the frames (F8–F15) of the frame pool 103b is finished, the stored data is outputted to the parallel/serial converter 104 through the multiplexor 102.

Therefore, the frame pools 103a and 103b alternately perform the read/write processes, so that the facsimile information as much as one sheet which is divided into 24 frames is outputted to the parallel/serial converter 104 through the frame memory 103.

Here, the multiplexor 102 is composed of two multiplexing structures for exclusively connecting the frame pools 103a and 103b with the serial/parallel converter 101 or the parallel/serial converter 104 in accordance with the control of the microcomputer 112, thus preventing any interference between signals.

The parallel/serial converter 104 counts the data arranged in a form of the frame unit outputted from the frame memory 103, converts it into the parallel data of a byte unit, and a noise is filtered from the parallel data by the filter 105, and the parallel data is inputted to the switch 107.

Here, the switch 107 selects the output of the luminance divider 106 when the user receives a broadcast signal, and selects the output of the filter 105 when the user receives a facsimile information.

Therefore, when the user receives a facsimile information, the output of the filter 105 is modulated to have a predetermined recording characteristic by the signal modulator 108, is recorded on the video tape by the record/reproduce unit 109, and is converted into the combined image signal by the image encoder 110. Thereafter, the output is outputted to the television monitor, so that the facsimile information is recorded and is displayed on the television monitor.

Here, the facsimile information may be printed on a predetermined paper by incorporating the print unit.

Figure 5:
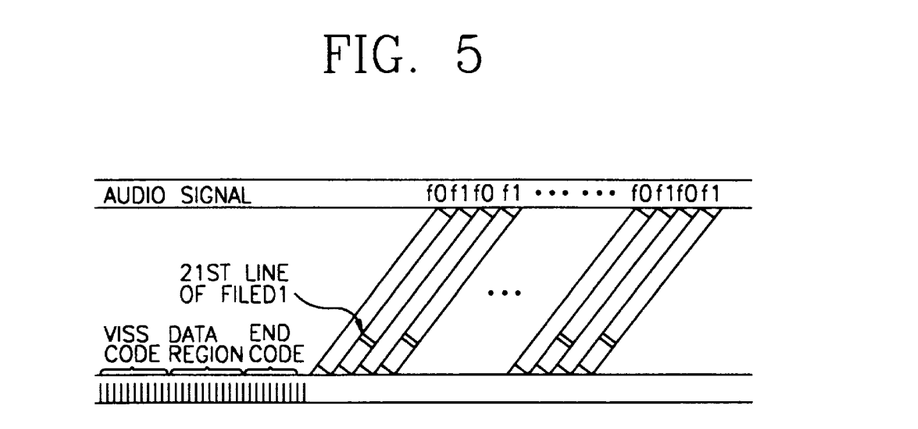
FIG. 5 is a view showing the storing pattern of a facsimile information according to the present invention.

In addition, as shown in FIG. 5, when the facsimile information is recorded on the video tape in a form of the frame unit, the record/reproduce unit 109 records the frame number on the 21st line of one field out of two frames and the information such as facsimile transmission date and time, its title and the like on the data region of the control track in ASCII code.

Figure 6:
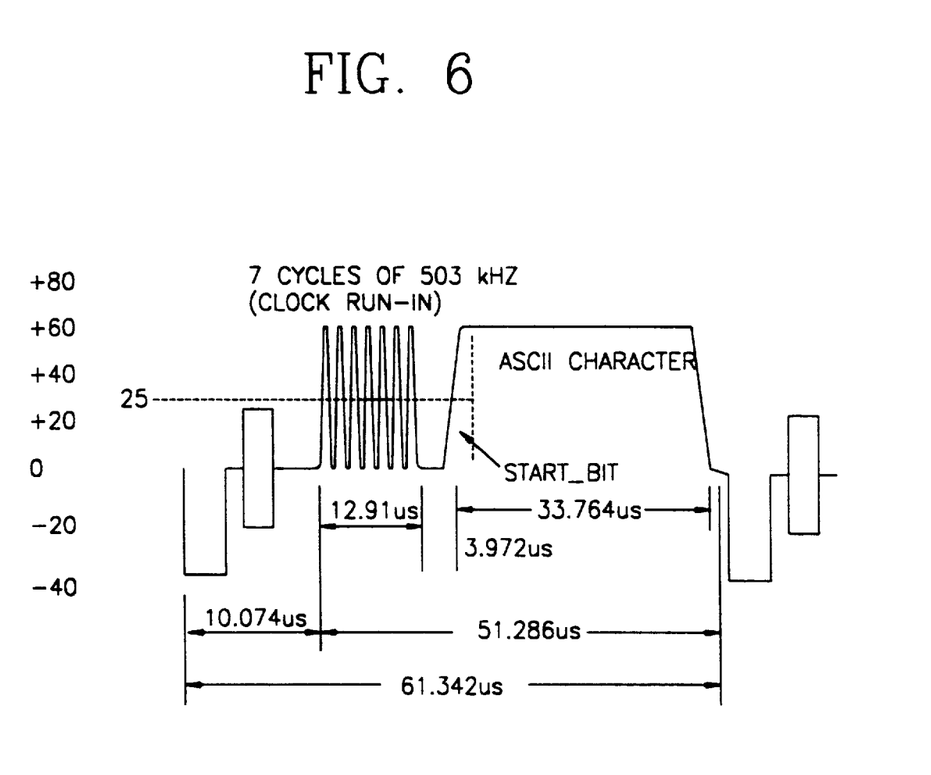
FIG. 6 is a view showing a data format of the 21st line of a video track according to the present invention.

Namely, as shown in FIG. 6, since the ASCII character of two bytes can be carried in the region "a" of the 21st line of one field out of two frames, the frame number is recorded therein.

Figure 7:
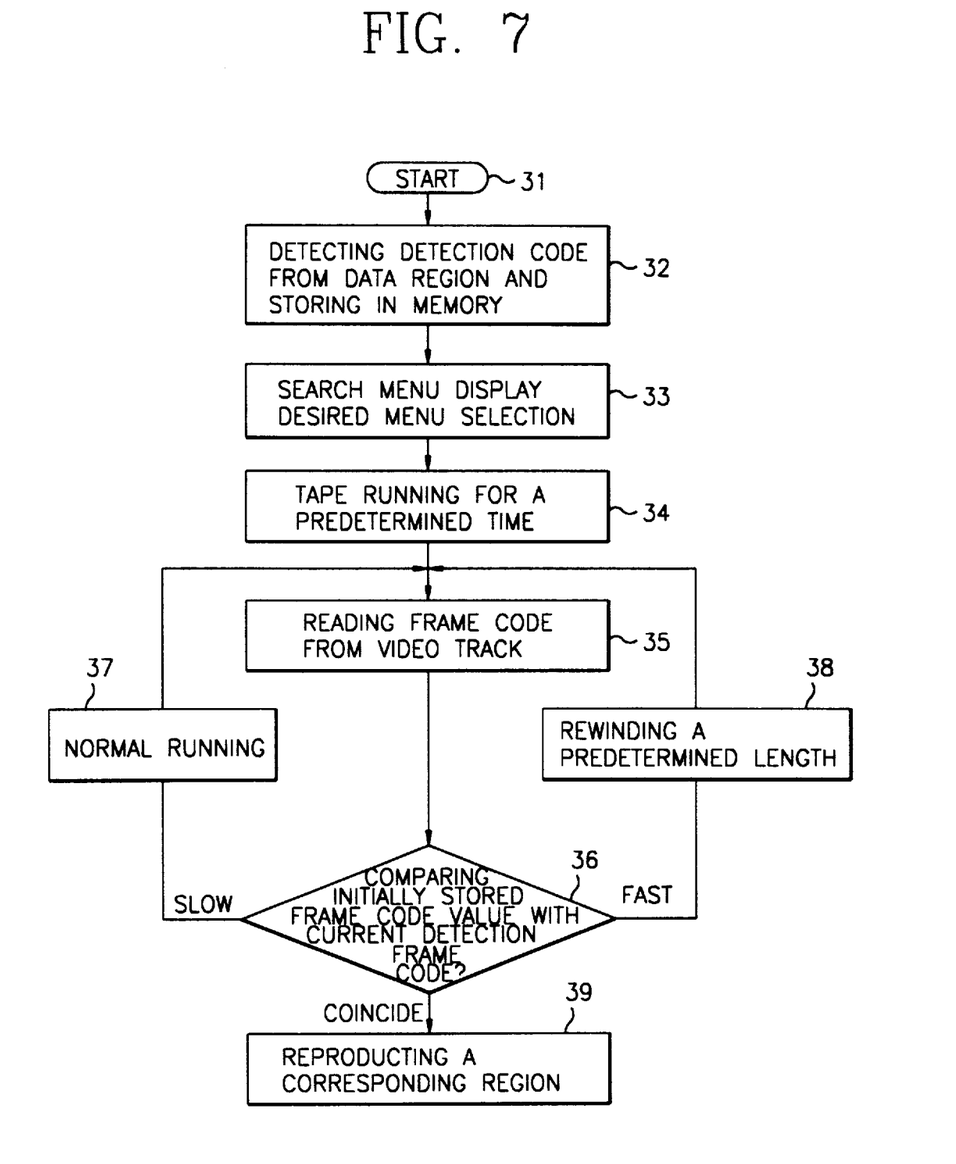
FIG. 7 is a flow chart of a process for searching a recorded facsimile information according to the present invention.

The search process of the facsimile information stored in the video tape will now be explained with reference to FIG. 7.

First, when the user sets the search mode using the remote controller 111, the record/reproduce unit 109 reproduce the facsimile information such as fax transmission date and time, its title and the like recorded on the data region of the control track in ASCII code, and the thusly reproduced facsimile information such as fax transmission date and time, its title and the like is stored in the internal memory of the microcomputer 112 (step 32), and at the same time, the fax transmission date and time, its title, and the like are displayed on the television monitor through the image encoder 110 as a search menu.

Therefore, the user selects a desired one among the displayed menu, and the selected menu is displayed on the monitor (step 33).

For example, when searching the stored facsimile information by date on which a predetermined facsimile transmission is received, when the user selects the date menu from the search menu using the remote controller 111, and then selects a specific date on which the facsimile is received, the microcomputer 112 control the record/reproduce unit 109 and runs the video tape for a predetermined time at high speed (step 34), the frame code corresponding to the selected date is read.

Thereafter, the microcomputer 112 compares the frame code of the selected date with the initially stored frame code (step 36). As a result, if the frame code of the selected date is later, the tape is run at normal speed (step 37). If the frame code of the selected date is earlier, the tape is rewound (step 38), and the frame code is read again by the record/reproduce unit 109 (step 35).

In addition, when the detected frame code coincides with the stored frame code, the facsimile information of the corresponding region is reproduced by controlling the record/reproduce unit 109, so that the desired facsimile information is displayed on the television monitor through the image encoder 110 (steps 36 and 39).

In addition, as another embodiment of the above-mentioned search method, there is a method which is directed to reading the frame number recorded on the 21st line of the field between two frames.

Namely, when the user sets the search mode using the remote controller 111, the caption circuit of the VCR detects the frame number from the 21st line of the field, and the detected frame number is stored in the microcomputer 112.

Thereafter, the microcomputer 112 reads the frame number selected by the user, and compares the read frame number with the initially stored frame number. As a result, the frame number of the selected date is later, the tape is run at normal speed. When the frame number of the selected date is earlier, the rewinding process of the tape is performed. When the detected frame number coincides with the stored frame number, the facsimile information of the corresponding region is reproduced and displayed on the television monitor.

Figure 8:
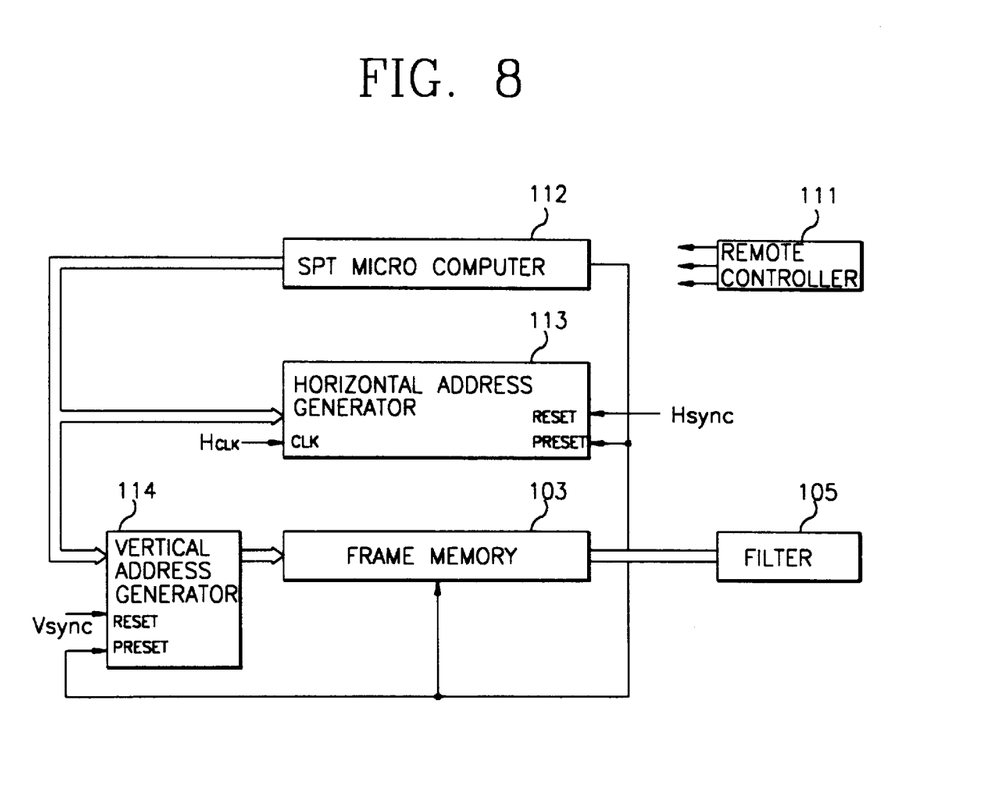
FIG. 8 is a block diagram of a facsimile information processing apparatus for a VCR according to the present invention.

As shown in FIG. 8, the facsimile information processing apparatus for a VCR according to another embodiment of the present invention further includes a horizontal address generator 113, which is preset in accordance with the control signal of the microcomputer 112, for applying a horizontal address to the frame memory 103 in accordance with a horizontal clock Hclk and a horizontal synchronous signal Hsync, and a vertical address generator 114, which a preset in accordance with the control signal of the microcomputer 112, for applying the vertical address to the frame memory 103, except for the elements shown in FIG. 2.

The scroll method of the facsimile information according to another embodiment of the facsimile information processing apparatus for a VCR will not be explained with reference to FIGS. 8 through 10.

First, in order to search the facsimile information stored in the video tape in a form of the frame unit when the user sets the search mode, the facsimile information arranged in a form of the frame unit and reproduced in the search process is stored in the frame memory 103.

Thereafter, when the user sets the display mode using the remote controller 111, the microcomputer 112 detects the key input, and outputs the preset signal and the start pixel data SPT to the horizontal address generator 113 and the vertical address generator 114, respectively.

In addition, the horizontal address generator 113 outputs the horizontal address to the frame memory 103 by counting the horizontal clock Hclk within the range of the horizontal synchronous signal Hsync from a specific address in accordance with the start pixel data SPT, and the vertical address generator 114 counts the vertical clock Vclk within the range of the vertical synchronous signal Vsync from a specific address in accordance with the start pixel data SPT and outputs it to the frame memory 103.

Therefore, the pixels in the region ranging from the start pixels of each of the frames F0, F1, . . . , F23 of the memory to the 216 dots/mm (27 bytes) in the rightward direction and to 480 lines in the downward direction are read, and the facsimile information stored in the frame memory 103 is outputted to the television through the filter 105, is displayed on the monitor as a still picture.

Here, the display mode set by the user includes a "216" mode, a "432" mode, a "648" mode, a "864" mode, and a global mode.

Figure 9:
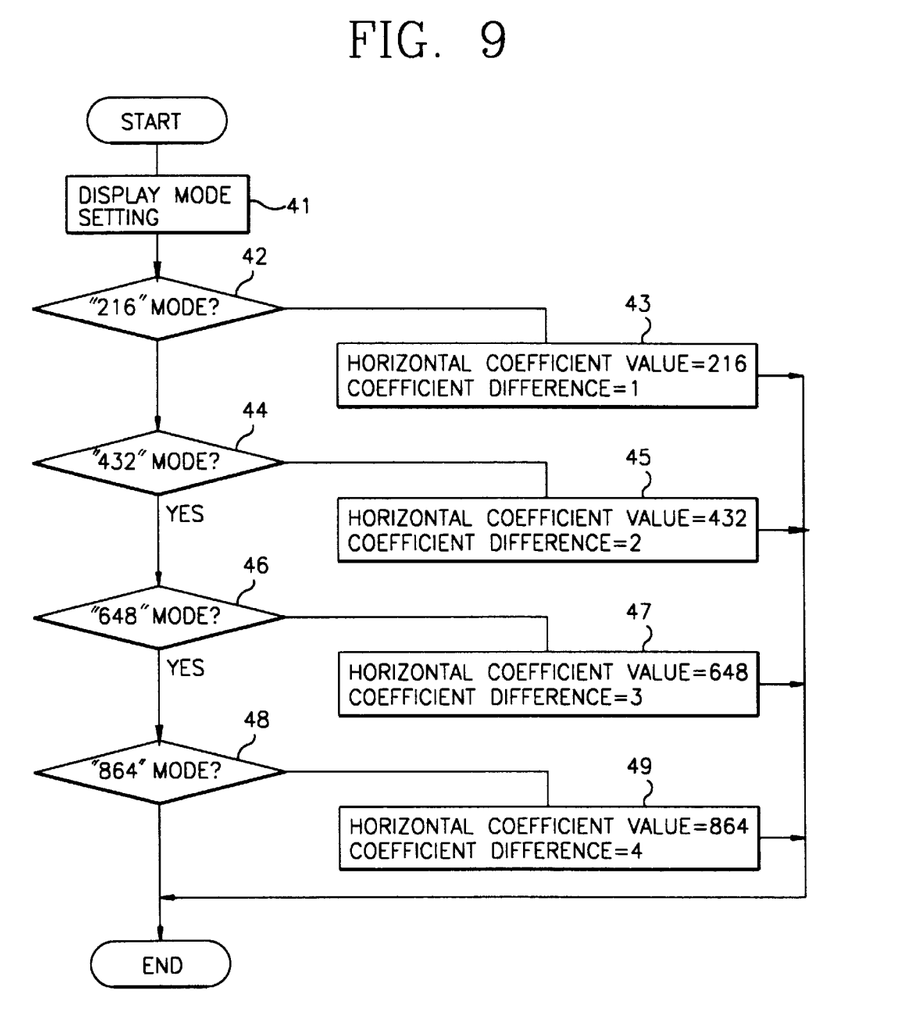
FIG. 9 is a flow chart of a process for setting a display mode of FIG. 8 according to the present invention.

As shown in FIG. 9, when the user selects the "216" mode (step 42) using the remote controller 111, the horizontal address generator 113 sets the count value in the horizontal direction as 216, and the count interval of the pixel as "1" (step 43). When the "432" mode is selected (step 44), the count value in the horizontal direction is set as 432, and the count interval of the pixel is set as "2" (step 45).

In addition, when the "648" mode is selected, the count value in the horizontal direction is set as 648, and the count interval of the pixel is set as "3" (step 47), and when the "864" mode is selected (step 48), the count value in the horizontal direction is set as 864, and the count interval of the pixel is set as "4" (step 49), and when the global mode is selected, the count value in the horizontal direction is set as 1728, thus displaying the facsimile information as much as one sheet on the screen.

Namely, in the "216" mode, the pixels stored in the frame memory 103 are counted one-by-one, and the pixels of 216 dots are read for one cycle of the horizontal synchronous signal Hsyn, and in the "432" mode, the pixels are counted by two, and the pixels of 432 dots are read for one cycle of the horizontal synchronous signal Hysn, and in the "648" mode, the pixels are counted by three, and the pixels of the 648 dots are read for one cycle of the horizontal synchronous signal Hysn, and in the "864" mode, the pixels are counted by four, and the pixels of the 864 dots are read for one cycle of the horizontal signal Hsyn, thus outputting the horizontal clock Hclk twice, three times, and four times.

Therefore, in case of the "216" mode, the facsimile information stored in the frame F0 of the frame memory 103 is displayed on the screen of the television, and in case of the "432" mode, the facsimile information stored in the frames F0 and F1 of the frame memory 103 is displayed on the screen of the television, and in case of the "648" mode, the facsimile information stored in the frames F0, F1, and F2 of the frame memory 103 is displayed on the screen of the television, and in case of the "864" mode, the facsimile information stored in the frames F0, F1, F2 and F3 of the frame memory 103 is displayed on the screen of the television.

Figure 10:
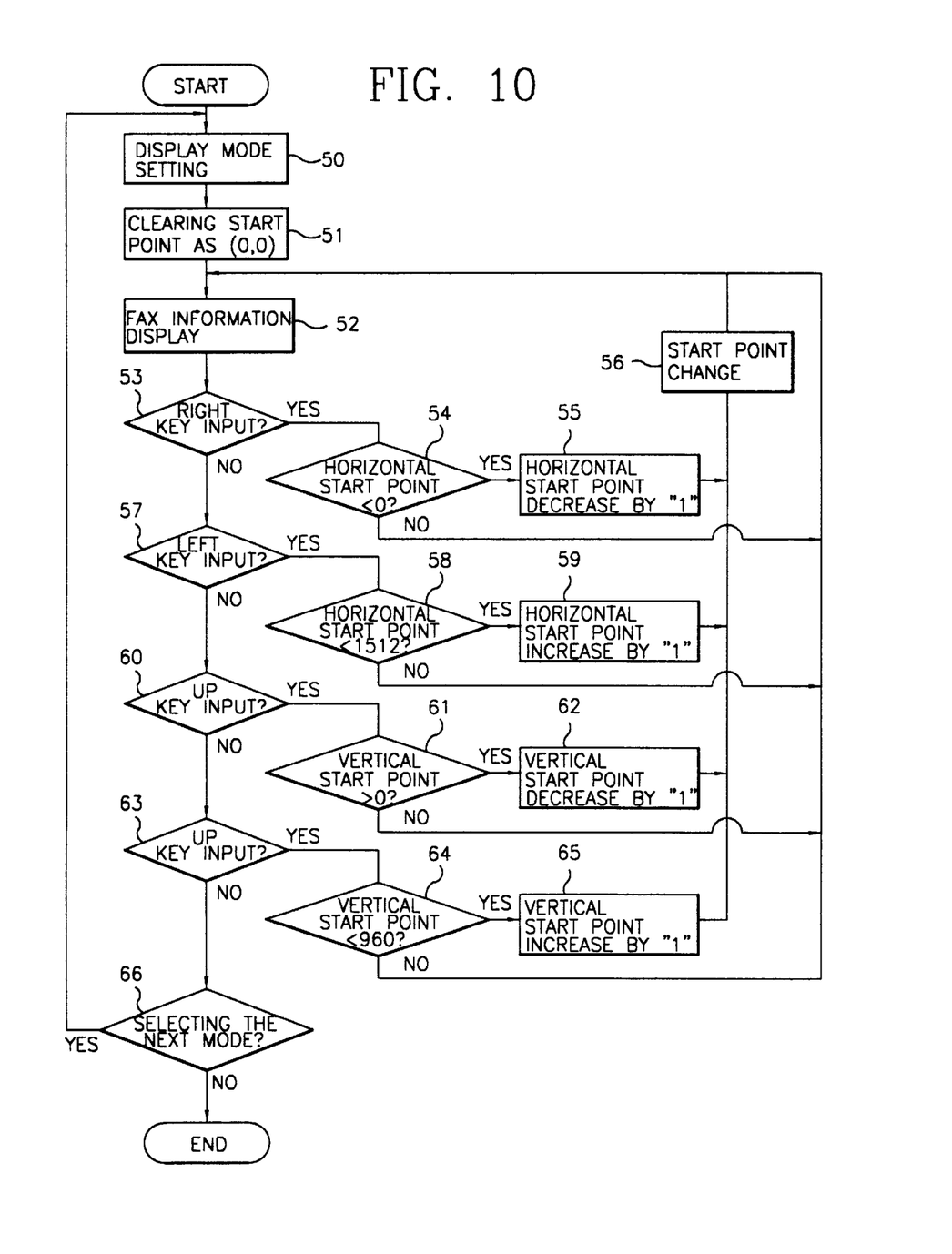
FIG. 10 is a flow chart of a process for scrolling the facsimile information displayed on the screen of FIG. 8 according to the present invention.

As shown in FIG. 10, when the facsimile information is displayed on the screen of the television in accordance with the set display mode, the microcomputer 112 checks the "right, left, up, down" key inputs (steps 50, 51, and 52).

For example, when the "right" key is inputted by the user in a state that the facsimile stored in the frame F0 is displayed on the screen of the television in the "216" mode (step 53), the microcomputer 112 moves the screen in the rightward direction by reducing the horizontal start pixel StatX by "1" and by moving the start pixel (steps 55 and 56) when the horizontal start pixel StatX is larger than "0", and the microcomputer 112 moves the screen in the leftward direction by increasing the horizontal start pixel StatX when the horizontal start pixel StatX is smaller than 1512 (steps 57 and 58) after the "left" key is inputted (step 59).

In addition, when the "up" key in inputted, and the vertical start pixel StatY is greater than "0" (steps 60 and 61), the microcomputer 112 moves the screen in the upward direction by reducing the vertical start pixel by "1" (step 62). When the "down" key is inputted, the vertical start pixel StatY is smaller than 96 (steps 63 and 64), the microcomputer 112 moves the screen in the downward direction by increasing the vertical start pixel by "1" (step 65), and then the scroll is performed. The moving range in the upward and downward directions are variable and are not limited to "1".

Thereafter, when the next stage is selected, the above-mentioned processes are repeated.

In addition, the "432" mode, the "648" mode, and the "864" mode are the same as the "216" mode except that the horizontal start pixel StatX is differently set when the "left" key is inputted.

Namely, in the "432" mode, when the "left" key is inputted, the microcomputer 112 moves the screen in the leftward direction by increasing the horizontal start pixel StatX by "1" when the horizontal start pixel StatX is smaller than 1296, and in the "648" mode, when the "left" key is inputted, the microcomputer 112 moves the screen in the leftward direction by increasing the horizontal start pixel StatX by "1" when the horizontal start pixel StatX is smaller than 1080, and in the "864" mode, when the "left" key is inputted, the microcomputer 112 moves the screen in the leftward direction by increasing the horizontal start pixel by "1" when the horizontal start pixel StatX is smaller than 864.

Here, the facsimile information displayed on the screen is reproduced from the video tape, and the data stored in two frame pools 103*a* and 103*b* of the frame memory 103 are read in accordance with the scrolling process.

Namely, when the vertical start pixel StatY is smaller than 480 lines, and "i" is changed from "0" to "7", where "i" denotes the frame, the facsimile information stored in the frame pool 103*a* is displayed on the screen, and when the "i" is changed from "8" to "15", the facsimile information stored in the frame pool 103*b* is displayed on the screen.

Meanwhile, when the vertical start pixel StatY is greater than 480 lines, and the "i" is changed from "16" to "23", the facsimile information stored in the frame pool 103*b* is not filled on the screen. Namely, the facsimile information is not filled at the lower portion of the screen, and thus the lower portion of the same remains vacant.

The facsimile information of the frame pool 103*a* is filled in the vacant portion of the screen, so that the facsimile information of the frame pools 103a and 103b are concurrently present on the screen.

In addition, when receiving the facsimile information as much as several sheets, the scrolling processes are repeated in accordance with the set display mode.

Thereafter, the user scrolls the facsimile information displayed on the screen in accordance with the set display mode, and searches a desired information. When the print mode is set, the microcomputer 112 performs the print mode by controlling the horizontal address generator 113, the vertical address generator 114, and the frame memory 103.

As described above, the facsimile information processing apparatus for a VCR and a method of the same according to the present invention is directed to dividing the transmitted facsimile information to have resolutions of the television and the VCR, storing it, and searching the stored facsimile information at high speed, so that it is possible to overcome the resolution difference problem between the facsimile machine, the television, and the VCR, and to search the stored information at high speed.

In addition, the present invention is directed to displaying the facsimile information to have a proper display mode, scrolling the displayed facsimile information, and searching a desired data, thus preventing consumption of the papers.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A facsimile information processing method for a video cassette tape recorder, comprising the steps of:

recording the received facsimile information in the frame memory which is divided into a plurality of frames and the facsimile information arranged in a form of a frame unit and outputted from the frame memory on a video tape;

searching the facsimile information of a selection menu by detecting the frame code from the video tape when a search mode is set; and scrolling a predetermined information by moving the facsimile information searched and displayed on the screen in the rightward and leftward direction.

2. The method of claim 1, wherein said storing step includes the steps of:

converting the received facsimile information into a binary data of white and black;

counting the converted binary data and converting it into a parallel data in the bite unit;

sequentially storing the converted parallel data into the frame memory which is divided into a plurality of frames; and outputting the stored facsimile information in a form of the frame unit and recording it on a video tape when the storing process is finished.

3. The method of claim 1, wherein a parallel data stored in the frame memory is sequentially stored into pixels arranged in the region ranged from 216 dots/mm(27 bytes) in the rightward direction to 480 lines in the downward direction from a start pixel of a plurality of frames.

4. The method of claim 1, wherein said searching step includes the steps of:

searching and storing a frame code from a data region positioned on a control track of a video tape when a user sets the search mode and displaying the search menu corresponding to the frame code on a screen of a television;

searching a frame code of a corresponding selection menu by running the video tape when a specific menu number is selected among the displayed search menu;

comparing the frame code of the selection menu with the stored frame code, running the tape at a normal speed when the frame code of the selection menu is later, rewinding the tape when the frame code of the selection menu is earlier, and repeatedly searching the frame code; and reproducing the facsimile information of a corresponding region when the detected frame code coincides with the stored frame code.

5. The method of claim 4, wherein said frame code is directed to using the frame number recorded on a 21st line of one field in ASCII out of two frames when storing the facsimile information on the video tape.

6. The method of claim 1, wherein said scrolling step includes the steps of:

storing the facsimile information of the reproduced frame unit into the frame memory when the search mode is set;

displaying the facsimile information stored in the frame memory by varying the count value in the horizontal direction and the count interval of the pixel in accordance with the display mode;

detecting the input of "right", "left", "up " and "down" when the facsimile information is displayed on the screen; and moving the screen in rightward, leftward, upward, and downward directions by increasing/decreasing the start pixel arranged in the horizontal direction and the start pixel arranged in the vertical direction in accordance with the input of the keys.

7. The method of claim 6, wherein said display mode includes a "216" mode, a "432" mode, a "648" mode, a "864" mode, and a global mode.

8. The method of claim 6, wherein in said display step, in case of the "216" mode, the frame F0 is displayed on the screen by setting the count value in the horizontal direction as 216 and the count interval as "1", and in case of the "432" mode, the frames F0 and F1 are displayed on the screen by setting the count value in the horizontal direction as 432, and the count interval of the pixel as "2", and in case of the "648" mode, the frames F0, F1, and F2 are displayed on the screen by setting the count value in the horizontal direction as 648, and the count interval of the pixel as "3", and in the "864" mode, the frames F0. F1, F2, and F3 are displayed on the screen by setting the count value in the horizontal direction as 864, and the interval of the pixel as "4", and in the global mode, the facsimile information as much as one sheet is displayed on the screen by setting the count value in the horizontal direction as 1728.

9. The method of claim 6, wherein in said "216" mode of the screen moving step, when the "right" key is inputted, the screen is moved in the rightward direction by decreasing the start pixel in the horizontal direction when the start pixel in the horizontal direction is greater than "0", and when the "left" key is inputted, and the start pixel in the horizontal direction is smaller than 1512, the screen is moved in the leftward direction by increasing the start pixel in the horizontal direction, and when the "up" key is inputted, and the start pixel in the vertical direction is greater than "0", the screen is moved in the upward direction by decreasing the start pixel in the horizontal direction by a predetermined pixel, and when the "down" key is inputted, and the start pixel in the vertical direction is smaller than 960, the screen is moved in the downward direction by increasing the start pixel in the vertical direction.

10. The method of claim 6, wherein in said screen movement step, the "432" mode, the "648" mode, and the "864" mode are the same as the "216" mode except that when the "left" key is inputted, the start pixel in the horizontal direction is differently set.

11. The method of claim 10, wherein in said "432" mode, when the "left" key is inputted, and the start pixel in the horizontal direction is smaller than 1296, the screen is moved in the leftward direction by increasing the start pixel in the horizontal direction by a predetermined pixel, and in said "648" mode, when the "left" key is inputted, and the start pixel in the horizontal direction is smaller than 1080, the screen is moved in the leftward direction by increasing the start pixel in the horizontal direction by a predetermined pixel, and in said "864" mode, when the "left" key is inputted, and the start pixel in the horizontal direction is smaller than 864, the screen is moved in the leftward direction by increasing the start pixel in the horizontal direction by a predetermined pixel.

12. The method of claim 6, wherein a facsimile information stored in the first frame pool is displayed on the screen when "i", where "i" denotes a frame, is changed from "0" to "7" when the start pixel in the vertical direction which is referred to the count value of the pixel is smaller than 480 lines in the screen display step, and when the "i" is changed from "8" to "15", the facsimile information stored in the second frame pool is displayed on the screen.

13. The method of claim 6, wherein when the start pixel in the vertical direction which is referred to the count value of the pixel is greater than 480 lines, and the "i" is changed from 16 to 23 in the screen display step, the facsimile information stored in the second frame is displayed on a predetermined region out of the screen, and the facsimile information stored in the first frame is displayed on the remaining region out of the screen, whereby one screen in which the facsimile information of the first and second frames are concurrently stored is formed.

* * * * *